W. J. WILLIAMS.
APPARATUS FOR REGULATING THE VOLTAGE OF AN ELECTRIC CURRENT.
APPLICATION FILED MAR. 12, 1908.

907,931.

Patented Dec. 29, 1908.

2 SHEETS—SHEET 1.

Witnesses

Inventor
Wynant James Williams
by Walter E. Ward
Atty

W. J. WILLIAMS.
APPARATUS FOR REGULATING THE VOLTAGE OF AN ELECTRIC CURRENT.
APPLICATION FILED MAR. 12, 1908.

907,931.

Patented Dec. 29, 1908.

UNITED STATES PATENT OFFICE.

WYNANT JAMES WILLIAMS, OF ALBANY, NEW YORK.

APPARATUS FOR REGULATING THE VOLTAGE OF AN ELECTRIC CURRENT.

No. 907,931.  Specification of Letters Patent.  Patented Dec. 29, 1908.

Application filed March 12, 1908. Serial No. 420,543.

*To all whom it may concern:*

Be it known that I, WYNANT JAMES WILLIAMS, a citizen of Great Britain, residing at Albany, in the county of Albany and State of New York, have invented certain new and useful Improvements in Apparatus for Regulating the Voltage of an Electric Current, of which the following is a specification.

My invention relates to apparatus for automatically regulating the voltage on alternating current circuits.

The object of my invention is to provide means for automatically regulating the voltage on an electric circuit or system of circuits in such a manner that the voltage will rise at any desired rate as the load on the circuit or system of circuits increases.

My method of regulating depends upon the use of a core of laminated, paramagnetic material such as soft iron upon which is wound one or more coils of wire one of which is connected in series with the load circuit or system of circuits. The magnetomotive force produced by the current in the one coil or the resultant magnetomotive force produced by the currents in all the coils is at all times during the operation of the apparatus sufficient to carry the core through its cycle of magnetization from a practically saturated condition in one direction to a practically saturated condition in the opposite direction. The regulation is obtained by changing the rate at which this flux changes from one maximum value to the other and also by changing the periods in the cycle during which this flux changes. The means used to obtain the above results can be best understood by reference to the accompanying drawings.

Figure 1:
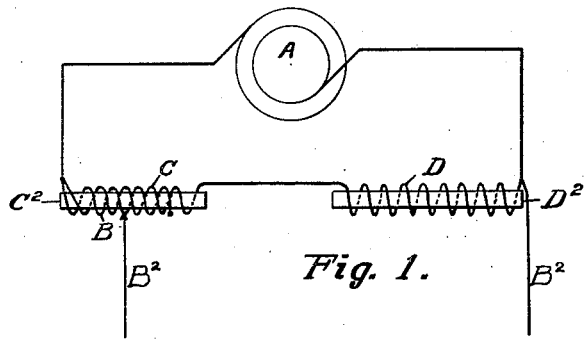
Figure 2:
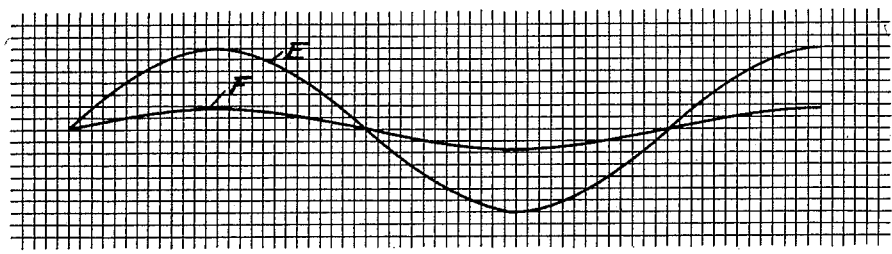
Figure 3:
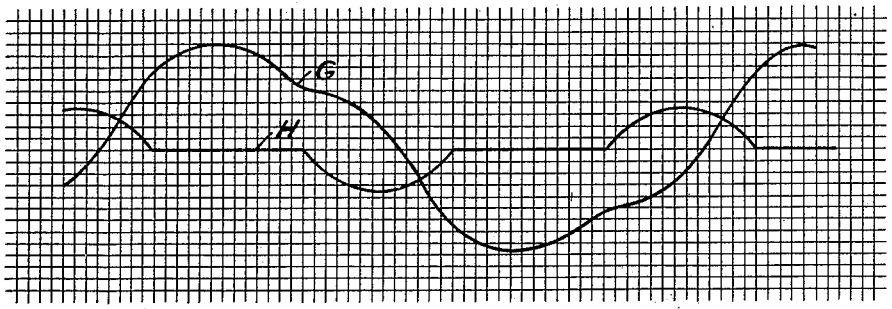
Figure 4:
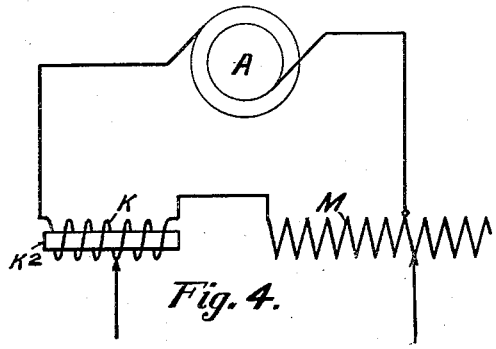
Figure 5:
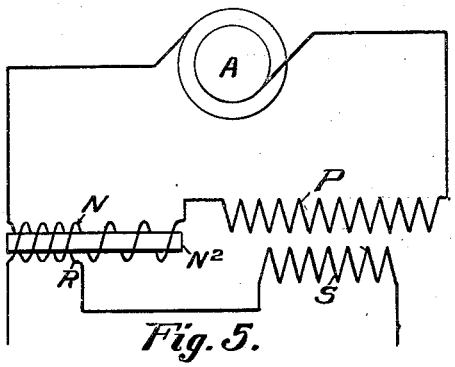
Figure 6:
Figure 7:
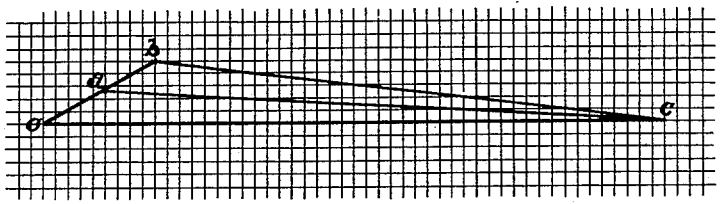
Figure 8:
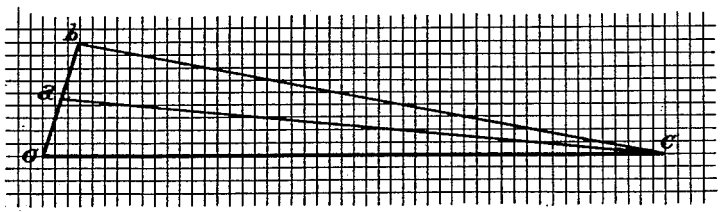

Figure 1 is a diagram showing the arrangement of my apparatus when used to regulate the voltage of an ordinary load circuit. Fig. 2 shows curves of the electromotive force in my apparatus without load. Fig. 3 shows curves of the electromotive force in my apparatus with load on. Fig. 4 is a diagram of my apparatus in connection with a compensator. Fig. 5 is a diagram of my apparatus in connection with a transformer. Figs. 6, 7 and 8 are diagrams used to show the compounding action of my apparatus when arranged as shown in Figs. 4 and 5.

Similar letters refer to similar parts throughout the several views.

A indicates a source of an approximately constant alternating electromotive force.

B and C are two coils wound upon the core $C^2$ said core being made of laminated, paramagnetic material such as soft iron. The coils B and C and core $C^2$ are so designed that the core is saturated by the resultant magnetomotive force produced by the currents in the two coils. D is another coil wound upon a separate core $D^2$ which does not become saturated.

C and D are connected in series across the circuit while B is connected in series with the load circuit $B^2$.

At no load the magnetizing current passes through the coils C and D and no current passes through coil B. The magnetizing current flowing through the coil C is sufficient to saturate the core $C^2$ upon which it is wound.

In Fig. 2 I show the electromotive force curves at no load. F is the electromotive force impressed across the terminals of the coil B. E is the electromotive force impressed across the terminals of the load circuit $B^2$.

Since this apparatus is supplied by an approximately constant electromotive force, to increase the load the impedance of the load circuit must be decreased. The impedance of the coil D is practically constant. Therefore as the load increases the ratio of the ampere turns of the coil B to the ampere turns of the coil C will change in such a manner that the resultant magnetomotive force will increase thus causing the core $C^2$ to become more quickly magnetized, and to become saturated sooner in each half cycle. As soon as the core $C^2$ becomes saturated the total electromotive force is thrown across the load circuit. When the currents in the two coils B and C decrease below the value necessary to saturate the core $C^2$ the flux through the coils will decrease thus giving back its energy to the circuit.

In Fig. 3 I show the electromotive force curves when load is taken by the load circuit. H is the electromotive force impressed across the terminals of the coil B and G is the electromotive force impressed across the terminals of the load circuit B³. Comparing these curves with the no load curves of Fig. 2 it will be seen that as the load increases the ordinates of the curve representing the electromotive force impressed across the terminals of the load circuit increase. This means that the square root of the average square of the ordinates of the curve G will be greater than the square root of the average square of the ordinates of the curve E, or in other words the effective volts across the load circuit will increase as the load increases.

Fig. 4 is a diagram showing the method of using my apparatus in connection with a compensator. K is a coil wound upon a core K², said core being saturated at all loads. This core and coil are so designed that the magnetizing current taken by the compensator M is sufficient to saturate the core K² upon which the coil K is wound. The ratio of the number of turns on the primary side to the number of turns on the secondary side of K differs from the ratio of the number of turns on the primary side to the number of turns on the secondary side of the compensator M in such a way that as the load increases the resultant magnetomotive force through the saturated core K² is increased thus causing the effective voltage across the secondary circuit to increase as the load increases for the same reason that the voltage across the load circuit in Fig. 1 increases with the load.

Fig. 5 is a diagram showing my apparatus used in connection with a transformer. This is the same as shown in Fig. 4 except that four coils are used and the primary and secondary circuits are insulated from each other.

The coils N and R are wound upon the saturated core N² and the coils P and S are the primary and secondary coils respectively of a transformer.

The electromotive force curves for Figs. 4 and 5 are similar to those shown in Figs. 2 and 3 in which F and H represent the primary electromotive force impressed across the terminals of the coil wound upon the saturated core and E and G represent the primary electromotive force impressed across the terminals of the coil wound upon the unsaturated core.

The electromotive force curves for the secondary coils are similar to those for the primary coils except that they are of opposite sign and are not of the same relative size owing to the fact that the ratio of the number of turns on the primary to the number of turns on the secondary is not the same on the saturated as on the unsaturated cores.

The vector sum of the back electromotive force generated in the primary coils wound upon the saturated and unsaturated cores is equal to the impressed electromotive force. The total electromotive force generated in the secondary coils is equal to the vector sum of the electromotive force generated in the separate coils.

In order to make clearer the compounding action of my apparatus as shown in Figs. 4 and 5 I have drawn the vector diagrams shown in Figs. 6, 7 and 8. These diagrams show the compounding action of either a compensator or a transformer on which the ratio of the primary windings to the secondary windings on the unsaturated core is 1 to 1 while the ratio of the same windings on the saturated core is 2 to 1.

Since the compounding action of my apparatus is due to the change in the form factor of the electromotive force curves, these curves will not in general be sine curves I have therefore reduced the actual curves to their equivalent sine curves and the length of the vectors in Figs. 6, 7 and 8 represent the effective values of these equivalent sine curves and the phase position of these vectors represent the phase position of these equvalent sine curves. In these figures C is the impressed electromotive force across the terminals of the primary circuit. $ob$ is the impressed electromotive force across the terminal of the coil wound upon the saturated core, $bc$ is the impressed electromotive force across the terminals of the coil wound upon the unsaturated core. $cb$ is the electromotive force generated in the secondary coil wound upon the unsaturated core, $ba$ is the electromotive force generated in the secondary coil wound upon the saturated core, and $ca$ is the electromotive force across the terminals of the secondary circuit.

Fig. 6 is the no load diagram, Fig. 7 shows the effect of increasing the load and Fig. 8 shows the effect of a still further increase.

The vector diagrams for Fig. 1 are similar to those for Figs. 4 and 5 except that there is no component $ba$. In Figs. 6, 7 and 8 let OC represent the impressed electromotive force across the circuit of Fig. 1 then $ob$ will represent the electromotive force impressed across the coil B wound upon the saturated core and $bc$ will represent the impressed electromotive force across the load circuit.

From Figs. 6, 7 and 8 it will be seen that for Fig. 1, $bc$ or the electromotive force across the load circuit increases as the load increases, and for Figs. 4 and 5, $ca$ or the electromotive force across the secondary circuit increases as the load increases. These figures also show how the rate at which the electromotive force across the secondary circuit will increase as the load increases can be adjusted by changing the ratio of the number of turns on the primary to the number of turns on the secondary coil wound upon the saturated core or in other words, by changing the ratio of $ob$ to $ba$ and also the position of these lines with respect to the line OC or the impressed electromotive force.

The reason for the increase in the phase angle between $oc$ and $ob$ with increase in load can be best understood by reference to Fig. 5. N and P are connected in series and must therefore have the same current passing through them. R and S are also connected in series and must therefore carry the same current. The core upon which N and R are wound is magnetized by the resultant magnetomotive force of the current in N and R. The core upon which P and S are wound is magnetized by the resultant magnetomotive force of the current in P and S. At no load R and S carry no current, N and P carry only the magnetizing current and the core $N^2$ is saturated. The back electromotive force generated in N and P are therefore in phase and opposed to the primary impressed electromotive force. If there were no secondary coil R wound upon the core $N^2$ and load was taken from S, the secondary of the transformer, enough current would flow through P the primary circuit to neutralize the effect of the secondary current in S and the core of the transformer would still be magnetized by the magnetizing current only. The core $N^2$ would now be magnetized by the resultant of the magnetizing current and the load current taken through N by the transformer. This resultant current is ahead in phase of the magnetizing current taken by the transformer and is also greater in value, therefore the core $N^2$ will be more rapidly magnetized and become sooner saturated. This means that the back electromotive force generated in N will reach its maximum sooner than the back electromotive force generated in P or in other words the electromotive force of N will be ahead in phase of the electromotive force of P. Since $N^2$ is magnetized partly by the load current it is evident that as the load increases $N^2$ will become sooner saturated and the phase angle between $oc$ and $ob$ will increase with the load. The effect of putting the secondary winding R on the saturated core $N^2$ is to partly neutralize the effect of the load current in N so that the resultant magnetomotive force which saturates the core $N^2$ will increase gradually as the load increases. The current in R is 180 electrical degrees out of phase with the load current in N. The ampere turns of R will neutralize the effect of an equal number of ampere turns of the load current in N. The resultant magnetizing ampere turns acting on the core $N^2$ will then be due to the unneutralized ampere turns of the load current in N, plus the ampere turns due to the transformer magnetizing current in N. It is therefore evident that changing the ratio of the number of turns of N and R not only changes the value of the electromotive forces generated in these coils but also their phase position with respect to the impressed primary electromotive force.

The reason for the phase position of the vectors of Figs. 6, 7 and 8 when they represent the electromotive forces in the different coils of Fig. 4 is the same as that given above for Fig. 5.

Comparing Figs. 1 and 5 it will be seen that the reactance D Fig. (1) takes a current similar to the magnetizing current taken by P Fig. 5. The load circuit $B^2$ Fig. (1) takes a current similar to the load current taken by P Fig. 5. The core $C^2$, Fig. (1) is saturated by the resultant current in C and B and since this resultant current is similar in every respect to the resultant current taken by N Fig. 5 the compounding effect of this apparatus is similar in every respect to that of Fig. 5 as described above. In Fig. 1 the rate at which the voltage will increase with increase of load can be changed by changing the ratio of the number of turns of the coils C and B. Changing this ratio will have the same effect as changing the ratio of N and R Fig. 5 that is it will not only change the value of the electromotive forces generated in C and B but also their vector position with respect to the impressed electromotive force.

What I claim as my invention and desire to secure by Letters Patent is:

1. An apparatus for regulating the voltage of an electric current consisting of a circuit leading from a source of an approximately constant electromotive force, a core of paramagnetic material normally saturated at all loads, another core of paramagnetic material not saturated, two primary coils connected in series with each other and with the supply circuit, one of these coils wound upon the saturated core and the other upon the unsaturated core, a load circuit, two secondary coils connected in series with each other and with the load circuit, one of these coils being wound upon the saturated core and the other upon the unsaturated core, the ratio of the number of turns on the primary coil to the number of turns on the secondary coil wound upon the saturated core not being equal to the ratio of the number of turns on the primary coil to the number of turns on the secondary coil wound upon the unsaturated core, substantially as described.

2. A device for regulating the voltage of an electric current consisting of, a circuit leading from a source of an approximately constant electromotive force, a transformer, a load circuit, a core of paramagnetic material which is normally saturated at all loads, a primary coil wound upon this saturated core and connected in series with the primary coil of the transformer and with the supply circuit, a secondary coil wound upon the saturated core and connected in series with the secondary coil of the transformer and with the load circuit, the ratio of the number of turns on the primary coil to the number of turns on the secondary coil of the transformer not being equal to the ratio of the number of turns on the primary coil to the number of turns on the secondary coil wound upon the saturated core, substantially as described and for the purposes set forth.

In testimony whereof I have affixed my signature in presence of two witnesses.

WYNANT JAMES WILLIAMS.

Witnesses:
  LOTTIE PRIOR,
  WALTER E. WARD.